United States Patent
Oda

(10) Patent No.: US 6,781,316 B2
(45) Date of Patent: Aug. 24, 2004

(54) VEHICLE LIGHT APPARATUS

(75) Inventor: Goichi Oda, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/206,167

(22) Filed: Jul. 25, 2002

(65) Prior Publication Data

US 2003/0030380 A1 Feb. 13, 2003

(30) Foreign Application Priority Data

Aug. 10, 2001 (JP) .................................... P. 2001-243666

(51) Int. Cl.[7] .............................. H05B 39/10; H02J 7/00; F21V 19/04
(52) U.S. Cl. .............................. 315/88; 315/90; 315/82; 315/77; 307/64; 307/10.1; 307/10.8; 362/20; 362/13
(58) Field of Search .............................. 315/88, 89–92, 315/82, 77; 307/64, 10.1, 10.8; 362/20, 13, 11

(56) References Cited

U.S. PATENT DOCUMENTS

| | | | | |
|---|---|---|---|---|
| 4,034,259 A | * | 7/1977 | Schoch | ......................... 315/93 |
| 6,310,445 B1 | * | 10/2001 | Kashaninejad | ............... 315/291 |
| 6,417,624 B1 | * | 7/2002 | Ito et al. | ......................... 315/88 |
| 2002/0011809 A1 | * | 1/2002 | Hartge et al. | ................ 315/313 |
| 2002/0047634 A1 | * | 4/2002 | Ito et al. | ...................... 315/291 |
| 2002/0101362 A1 | * | 8/2002 | Nishimura | ................... 340/907 |

FOREIGN PATENT DOCUMENTS

| | | |
|---|---|---|
| JP | 4-260840 | 9/1992 |
| JP | 2001-138799 | 5/2001 |
| JP | 2002-025788 | 1/2002 |
| JP | 2002-025790 | 1/2002 |

* cited by examiner

Primary Examiner—Tuyet T Vo
(74) Attorney, Agent, or Firm—Fish & Richardson P.C.

(57) ABSTRACT

A vehicle light apparatus 1 includes a discharge lamp 7 as a dipped (low)-beam light source and a high-beam light source or a light source of an auxiliary light (incandescent lamp) 3 as a substitutional light source of the discharge lamp. If the apparatus detects an input voltage from a power supply becoming equal to or greater than a threshold value in a state that only the discharge lamp is lit, the incandescent lamp is automatically lit on. To use the high-beam light source in place of the discharge lamp, light extinction lighting is performed or the light application direction is directed downward from the horizontal direction.

7 Claims, 4 Drawing Sheets

VEHICLE LIGHT APPARATUS

BACKGROUND OF THE INVENTION

This invention relates to a vehicle light apparatus using a discharge lamp and an incandescent lamp in combination in that the incandescent lamp is automatically lighting in place of the discharge lamp extinguished when power supply voltage fluctuates.

To supply power to electrical components for a vehicle, voltage generated by an alternator driven by a power source is stabilized by a regulator and is stored in a battery. Thus, there is a possibility that a surge called "load dump" will be caused by a failure or a break in the regulator, a battery contact failure, a rapid decrease in load current, or the like. Measures against the surge are taken for the electric components.

To prevent a failure of a discharge lamp lighting circuit (so-called "ballast circuit") when load dump occurs, for example, a headlamp apparatus using a discharge lamp as a light source is provided with a protection circuit to prevent the circuit from operating at higher input voltage than a predetermined level.

However, for example, when load dump occurs during nighttime high-speed driving, if the discharge lamp switches off as the operation of the lighting circuit stops, the driver's view is lost in an instant and the driver is forced to drive in darkness and thus it is feared that safe driving may be seriously compromised; this is a problem.

SUMMARY OF THE INVENTION

It is therefore an object of the invention to ensure the driver's view by lighting an incandescent lamp in place of a discharge lamp when the discharge lamp is switched off as load dump occurs.

To the end, according to the invention, there is provided a vehicle light apparatus comprising: a discharge lamp as a dipped-beam (low-beam) light source; an incandescent lamp as a substitutional light source of the discharge lamp; a circuit for detecting an input voltage from a power supply becoming equal to or greater than a threshold value in a state that only the discharge lamp is lit and automatically lighting the incandescent lamp.

Therefore, according to the invention, the incandescent lamp for the high-beam light source or the light source of the auxiliary light is lit in place of the discharge lamp switched off if the input voltage from the power supply becomes high, so that the driver's view can be ensured.

DETAILED DESCRIPTION OF THE PREFERRED EMBODIMENTS

A vehicle light apparatus of the invention has a configuration wherein a discharge lamp is used as a light source for dipped-beam (low-beam) application and an incandescent lamp of a light source for high-beam application or a light source of an auxiliary light is used as a substitutional light source of the discharge lamp; for example, a mode in which the light source for dipped-beam application and the light source for high-beam application are housed in one light, a mode in which the light sources are housed in separate lights, or the like are applicable. A fog lamp, a cornering lamp, etc., are also applicable as the auxiliary light.

Figure 1:
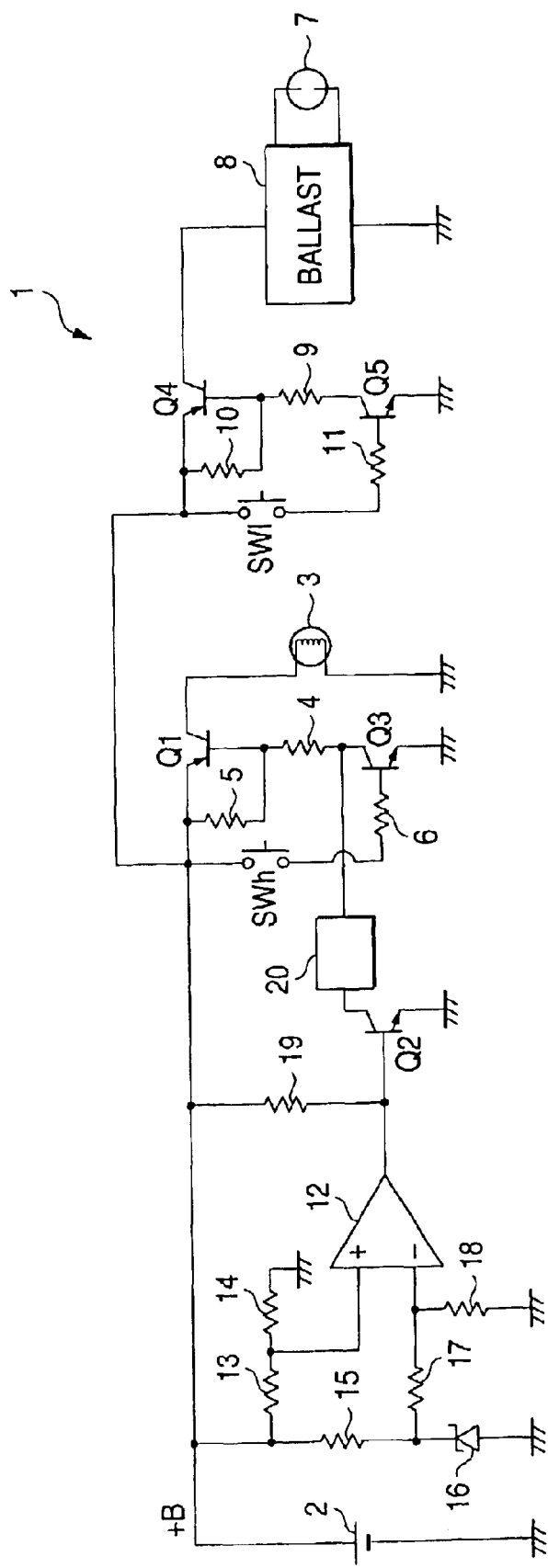
FIG. 1 is a circuit diagram to show a configuration example according to the invention.

FIG. 1 shows a circuit configuration example of a vehicle light apparatus 1; a high-beam light source (halogen lamp, etc.,) is used as a substitutional light source of a discharge lamp.

Input voltage (or supply voltage, hereinafter described as +B) from a power supply (battery) 2 is supplied via a pnp transistor Q1 to an incandescent lamp 3 for a high beam. That is, the transistor Q1 has an emitter connected to a positive electrode of the power supply 2, a collector connected to the incandescent lamp 3, and a base to which a collector of an npn transistor Q3 is connected via a resistor 4. A resistor 5 is inserted between the base and the emitter of the transistor Q1.

The transistor Q3 having an emitter grounded has a base connected to a high-beam lighting switch SWh via a resistor 6, and the switch is connected to a power supply line (+B line).

Power supply from the power supply 2 to a ballast circuit 8 of a discharge lamp 7 also has a similar configuration to that to the incandescent lamp 3, and a pnp transistor Q4, an npn transistor Q5, and a dipped-beam lighting switch SW1 are provided. That is, the transistor Q4 has an emitter connected to the power supply line (+B line) and collector output of the transistor Q4 is supplied to the ballast circuit 8. The transistor Q4 has a base connected to a collector of the transistor Q5 via a resistor 9. A resistor 10 is inserted between the base and the emitter of the transistor Q4.

The transistor Q5 having an emitter grounded has a base connected to the lighting switch SW1 via a resistor 11, and the switch is connected to the power supply line (+B line).

In the example, a comparator 12 is used as a circuit for determining whether or not the input voltage from the power supply 2 becomes equal to or greater than a threshold value (V1). That is, voltage dividing resistors 13 and 14 for the input voltage are provided and the voltage detected by the resistors is supplied to a positive input terminal of the comparator 12. Reference voltage provided by stabilizing by a Zener diode 16 the input voltage supplied to the Zener diode 16 via a resistor 15 is supplied to a negative input terminal of the comparator 12 via resistors 17 and 18. The reference voltage is a threshold value for the input voltage detection value (resistor-divided value) and corresponds to V1 for the input voltage. For example, if the input voltage is rating 12 V, preferably the value of V1 is a value larger than at least 16 V (upper limit value defined so that the ballast circuit normally operates) in the range of 17 V to 18 V.

An output signal of the comparator 12 is sent to a base of an npn transistor Q2 having an emitter grounded and a collector of the transistor Q2 is connected to the collector of the transistor Q3 directly or via a circuit 20 described later. An output terminal of the comparator is connected to the power supply line via a resistor 19.

In the circuit, when the input voltage from the power supply 2 is less than V1, the comparator 12 outputs low and therefore, for example, as the lighting switch SWh is turned on, the transistors Q3 and Q1 are turned on, lighting the incandescent lamp 3 for a high beam. Likewise, as the lighting switch SW1 is turned on, the transistors Q5 and Q4 are turned on, supplying power to the ballast circuit 8 for lighting the discharge lamp 7 for a low beam.

For example, if load damp occurs and the power supply voltage becomes an overvoltage in a state in which the incandescent lamp 3 is not lit and only the discharge lamp 7 is lit, when the comparator 12 detects the input voltage becoming equal to or greater than the threshold value V1, the comparator 12 outputs a high signal and thus the transistor Q2 is turned on. Accordingly, if the circuit 20 is not formed (namely, if the collector of the transistor Q2 is connected to the collector of the transistor Q3), the transistor Q1 is turned on and thus the incandescent lamp 3 is automatically lit. Therefore, if a protection circuit of the discharge lamp operates as the input voltage becomes an overvoltage and the discharge lamp is switched off, the incandescent lamp for a high beam is used in place of the discharge lamp.

The light source of a fog lamp, etc., rather than the incandescent lamp may be lit automatically; to light the high-beam light source as the substitutional light source of the discharge lamp, dazzling of road users (drivers of coming vehicles, pedestrians, etc.,) as for the brightness and light application direction of the high-beam light source introduces a problem; preferably, for example, a control circuit is provided for performing light extinction lighting in response to the input voltage from the power supply.

Figure 2:
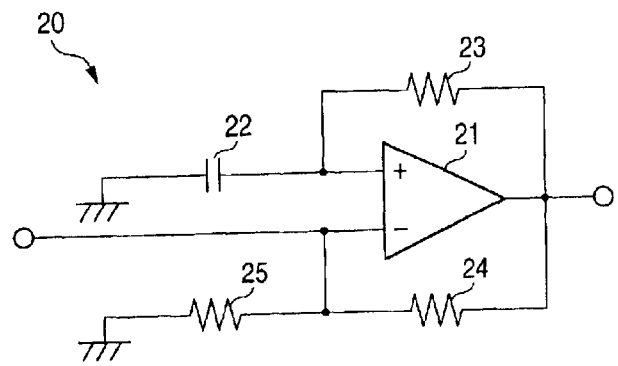
FIG. 2 is a circuit diagram to describe light extinction lighting of an incandescent lamp.

To do this, the control circuit 20 may be added to the output stage of the transistor Q2 in FIG. 1; for example, a configuration example in FIG. 2 can be named.

In the example, an oscillation circuit using an operational amplifier 21 is provided. A noninverting input terminal of the operational amplifier 21 is grounded via a capacitor 22 and a feedback resistor 23 is placed between the terminal and an output terminal. An inverting input terminal of the operational amplifier 21 is connected to the connection point of resistors 24 and 25 and the resistor 25 is connected at one end to the output terminal of the operational amplifier 21 via the resistor 24 and is at an opposite end grounded.

To apply the circuit to the circuit previously described with reference to FIG. 1, the collector of the transistor Q2 is connected to the inverting input terminal of the operational amplifier 21 and the output terminal of the operational amplifier 21 is connected to the collector of the transistor Q3. Accordingly, dimming control can be performed by chopping involved in the supply current from the transistor Q1 to the incandescent lamp 3. That is, switching control of the transistor Q1 is performed based on the duty ratio (or duty cycle) responsive to the input voltage, whereby the average current can be changed for lighting the incandescent lamp in an extinction state from the stipulated brightness (brightness when a high beam is applied). The chopper system using the circuit has a small loss and heating in brightness control and is suited for miniaturization.

Figure 3:
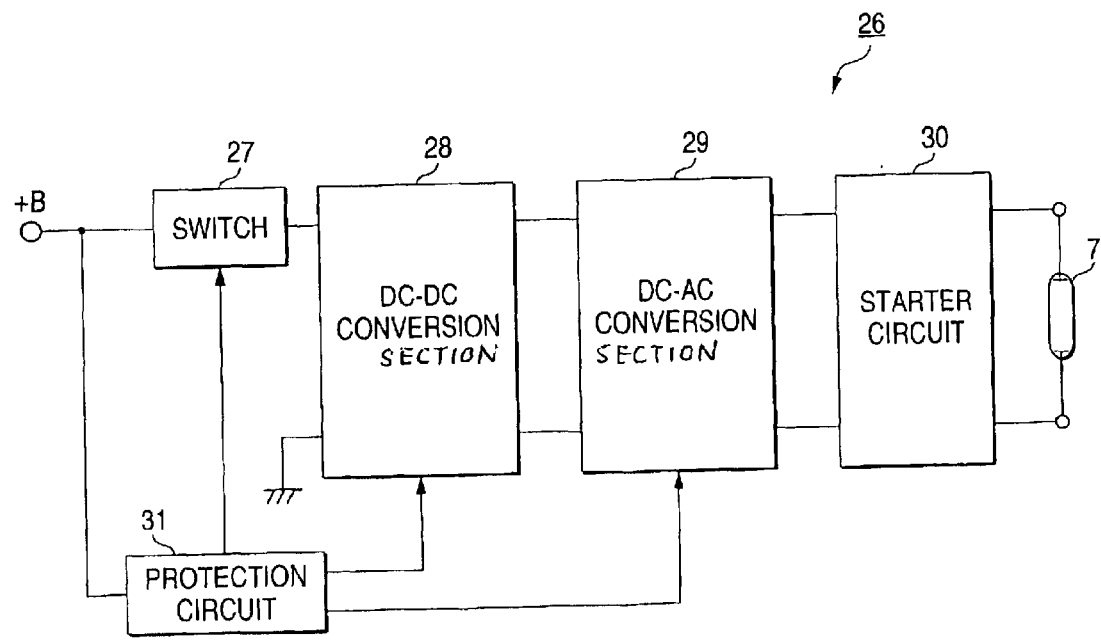
FIG. 3 is a block diagram to show a configuration example of a lighting circuit of a discharge lamp.

By the way, when load dump occurs, the protection circuit shuts off power supply to the discharge lamp. For the method, the following mode is known:

FIG. 3 schematically shows a configuration example 26 of the ballast circuit 8. For example, the input current (+B) supplied via the transistor Q4 is supplied to a DC-DC conversion section 28 via switch means 27 (relay, semiconductor switching element, etc.,).

For example, the configuration of a switching regulator is used for the DC-DC conversion section 28 and its DC output is sent to a DC-AC conversion section (inverter) 29 following the DC-DC conversion section 28. AC output of the DC-AC conversion section 29 is supplied through a starter circuit 30 to the discharge lamp 7.

A protection circuit 31 for determining whether or not power supply to the discharge lamp 7 is enabled contains comparison means and detects the input voltage and compares the input voltage with a threshold value (V2). If the protection circuit 31 detects an overvoltage state from the comparison result, for example, it controls the switch means 27 to shut off power supply to the DC-DC conversion section 28 and later or sends a control signal to the DC-DC conversion section 28 to stop the operation thereof or a control signal to the DC-AC conversion section 29 to stop the operation or drive thereof.

It is desirable that the threshold value V2 should be set higher than the threshold value V1 (V2>V1). That is, the second threshold value V2 higher than the first threshold value V1 set for the input voltage for automatically lighting the incandescent lamp is set and when the input voltage becomes equal to or greater than V2, the discharge lamp is switched off. Accordingly, when the input voltage rises, the incandescent lamp can be lit before the discharge lamp is switched off, so that the safety is higher and the road users are less affected as compared with the case where V1 is set equal to V2 (abrupt switching from the discharge lamp to the incandescent lamp). Preferably, the threshold value V2 is set in the range of 20 V to 24 V when the rated voltage is 12 V.

To use the incandescent lamp of the high-beam light source intact as the low-beam light source, it involves a problem in the light application direction and there is a fear of dazzling road users.

Figure 4:
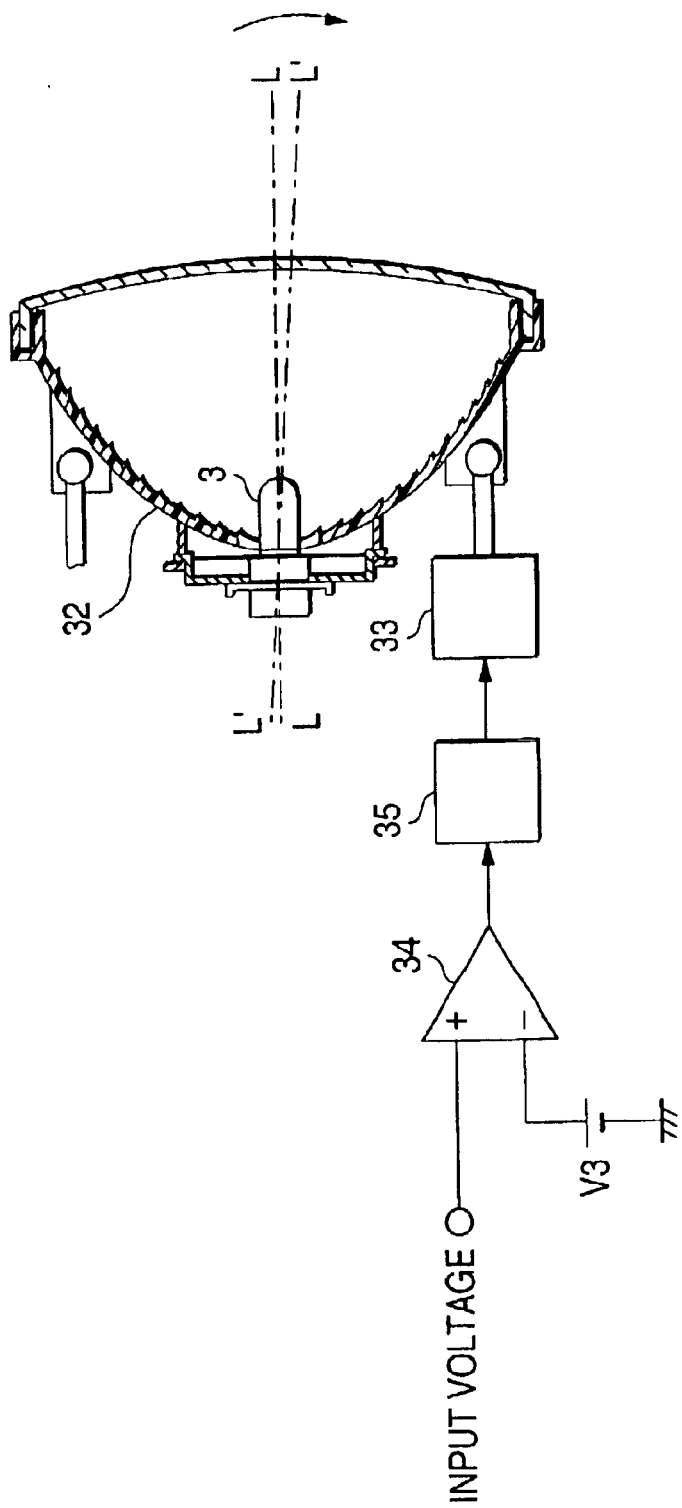
FIG. 4 is a drawing to describe light application direction control of vehicle light.

Then, preferably, as for the input voltage from the power supply, a third threshold value (V3) exceeding the threshold value V1 and being less than the threshold value V2 is set and when the input voltage becomes equal to or greater than V3, the state of the light source, a reflecting mirror, a shade, etc., is controlled so that the setup optical axis related to the high-beam light source (incandescent lamp) is directed downward from the horizontal direction. For example, as shown in FIG. 4, in a light comprising a mechanism (leveling mechanism) for inclining the position of a reflecting mirror 32 by an actuator 33, setup optical axis L-L of the incandescent lamp 3 is inclined as indicated by "L'-L'" so that the applied light is directed downward from the horizontal reference plane (horizontal plane containing the light emission point of the light source). For this purpose, comparison means 34 having a threshold value corresponding to V3 may be provided, a signal output when the input voltage becomes equal to or greater than V3 may be sent to a drive section 35, and the control voltage at the time may be supplied to the actuator 33, thereby directing the optical axis direction of the reflecting mirror 32 downward.

Figure 5:
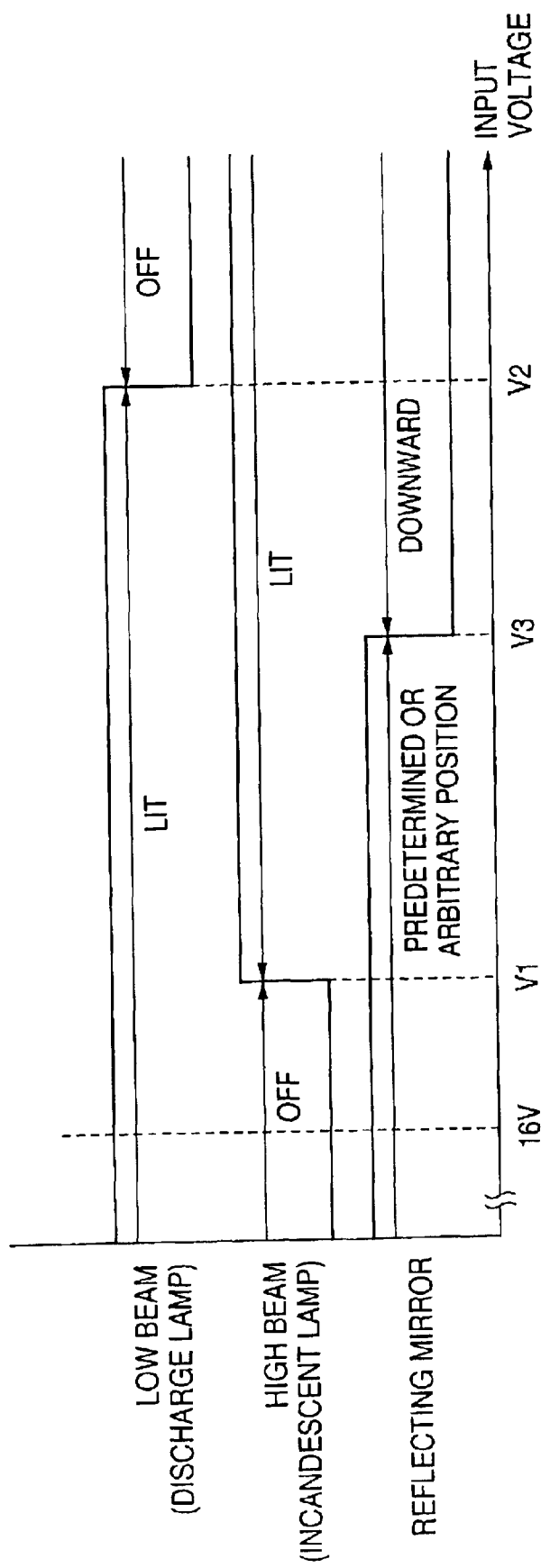
FIG. 5 is a chart to describe the operation of apparatus.

FIG. 5 is a state diagram to describe an operation example of the apparatus according to the invention and shows the state of each beam and the reflecting mirror with the input voltage taken on the horizontal axis. V1, V2, and V3 shown on the horizontal axis are the threshold values described above.

As shown in the figure, "16 V<V1<V3<V2" is on the input voltage axis and the discharge lamp may be lit when the input voltage is in the range less than V2 and the discharge lamp is switched off when the input voltage is in the range equal to or greater than V2. The incandescent lamp as the substitutional light source (in the example, high-beam light source) is switched off when the input voltage is in the range less than V1 and the incandescent lamp is automatically lit when the input voltage is in the range equal to or greater than V1.

When the input voltage is in the range less than V3, the inclination state of the reflecting mirror relative to the incandescent lamp indicates a predetermined or arbitrary position (auto leveling control, etc.,) and when the input voltage is in the range equal to or greater than V3, the inclination state becomes a downward state from the horizontal reference plane. When the incandescent lamp is automatically lit at V1, the reflecting mirror is not immediately inclined and after the input voltage reaches V3, the light application direction is placed in a downward state, whereby brightness change and light application direction change are prevented from occurring at the same time and the effect on the drivers and road users can be lessened.

As seen in the figure, either of the discharge lamp and the incandescent lamp is lit regardless of the range of the input voltage and therefore the driver's view can always be ensured.

In the description previously given with reference to FIG. 1, the transistors Q1 and Q4 are used to supply power to each light source, but a configuration using MOS FET (field-effect transistor), a relay, etc., in place of the transistors Q1 and Q4 may be adopted and the invention can be embodied in various modes of detecting an overvoltage using a circuit added to any other electric component (for example, lighting a substitutional light source using detection information provided by conducting apparatus-to-apparatus communications).

As seen from the description made above, according to the invention, the high-beam light source or the light source of the auxiliary light is lit in place of the discharge lamp switched off if the input voltage from the power supply becomes high, so that the driver's view can be ensured. Therefore, when load dump occurs, safe driving can be ensured.

According to the invention, dazzling of road users, etc., can be prevented by performing light extinction lighting of the high-beam light source.

According to the invention, when the input voltage becomes an overvoltage, before the discharge lamp is switched off, the incandescent lamp of the substitutional light source can be lit.

According to the invention, dazzling of road users, etc., can be prevented and brightness change and light application direction change can be prevented from occurring at the same time.

What is claimed is:

1. A vehicle light apparatus comprising:
    a discharge lamp as a low-beam light source;
    an incandescent lamp as a substitutional light source of the discharge lamp; and
    a circuit for detecting an input voltage from a power supply becoming equal to or greater than first threshold value in a state that only the discharge lamp is lit, and automatically lighting the incandescent lamp when the input voltage becomes at least as high as the first threshold value.

2. The vehicle light apparatus as claimed in claim 1, wherein said incandescent lamp is one of a high-beam light source and an auxiliary light source.

3. The vehicle light apparatus as claimed in claim 2 further comprising: a circuit for performing light extinction lighting in response to the input voltage from the power supply when the high-beam light source is lit as the substitutional light source of the discharge lamp.

4. The vehicle light apparatus as claimed in claim 1, wherein the circuit is arranged to detect a second threshold value higher than the first threshold value wherein, when the input voltage becomes equal to or greater than the second threshold value, the discharge lamp is switched off.

5. The vehicle light apparatus as claimed in claim 4, wherein a third threshold value exceeding the first threshold value and being less than the second threshold value is set, and when said incandescent lamp is lit as the substitutional light source of the discharge lamp, if the input voltage from the power supply becomes equal to or greater than the third threshold value, a setup optical axis related to the light source is directed downward from a horizontal direction.

6. The vehicle light apparatus as claimed in claim 1, wherein the circuit is arranged to detect a second threshold value higher than the first threshold value wherein, when the input voltage becomes equal to or greater than the second threshold value, the discharge lamp is switched off.

7. The vehicle light apparatus as claimed in claim 6, wherein a third threshold value exceeding the first threshold value and being less than the second threshold value is set, and when the high-beam light source is lit as the substitutional light source of the discharge lamp, if the input voltage from the power supply becomes equal to or greater than the third threshold value, a setup optical axis related to the light source is directed downward from a horizontal direction.

* * * * *